United States Patent
Lee et al.

(10) Patent No.: US 9,342,207 B1
(45) Date of Patent: May 17, 2016

(54) PRESENTING MEDIA INSTANCES ON A COMMUNICATION DEVICE

(75) Inventors: Woojae Lee, Manhattan, KS (US); Sanjay K. Sharma, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1239 days.

(21) Appl. No.: 12/388,474

(22) Filed: Feb. 18, 2009

(51) Int. Cl.
G06F 3/048 (2013.01)
G06F 15/173 (2006.01)
G06F 3/0481 (2013.01)
G06F 17/30 (2006.01)

(52) U.S. Cl.
CPC ........ G06F 3/0481 (2013.01); G06F 17/30038 (2013.01)

(58) Field of Classification Search
CPC .................................................... G06F 3/0481
USPC ........................................................ 715/764
See application file for complete search history.

(56) References Cited

U.S. PATENT DOCUMENTS

| 6,128,655 | A  | * | 10/2000 | Fields et al. ................. | 709/219 |
| 6,389,467 | B1 | * | 5/2002  | Eyal ............................. | 709/223 |
| 6,735,628 | B2 | * | 5/2004  | Eyal ............................. | 709/223 |
| 7,159,174 | B2 | * | 1/2007  | Johnson et al. ............... | 715/716 |
| 7,797,446 | B2 | * | 9/2010  | Heller et al. .................. | 709/242 |
| 2002/0004803 | A1 | * | 1/2002 | Serebrennikov .............. | 707/513 |
| 2003/0009452 | A1 | * | 1/2003 | O'Rourke et al. ............. | 707/3 |
| 2003/0132953 | A1 | * | 7/2003 | Johnson et al. ............... | 345/716 |
| 2003/0208473 | A1 | * | 11/2003 | Lennon ......................... | 707/3 |
| 2006/0161635 | A1 | * | 7/2006 | Lamkin et al. ................ | 709/217 |
| 2006/0170945 | A1 | * | 8/2006 | Bill .............................. | 358/1.13 |
| 2007/0038610 | A1 | * | 2/2007 | Omoigui ........................ | 707/3 |
| 2009/0113301 | A1 | * | 4/2009 | Fisher et al. .................. | 715/716 |

OTHER PUBLICATIONS

Battocchi, Enrico, Pageplaylist, Mozdev.org, available at http://replay.waybackmachine.org/20051218091140/http://pageplaylist.mozdev.org/ (archived Dec. 18, 2005).*

Pageplaylist: feedback, Mozdev.org, available at http://web.archive.org/web/20070623104113/http://pageplaylist.mozdev.org/feedback.html (archived Jun. 23, 2007).*

* cited by examiner

*Primary Examiner* — Doon Chow
*Assistant Examiner* — Conrad Pack (57) ABSTRACT

A system is provided for presenting media instances on communication devices. The system includes a processor on a communication device, a source component, and a target component. The source component, when executed by the processor, parses a selected media container to identify a set of media instances of a first type and constructs a media instance list that comprises the identified set of media instances, wherein the selected media container is inaccessible by an activated media presenter. The target component, when executed by the processor, enables the activated media presenter to present at least two of the set of media instances from the media instance list to a user interface without deactivating between presentations.

20 Claims, 5 Drawing Sheets

PRESENTING MEDIA INSTANCES ON A COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A communication device may be a mobile phone, a wireless handset, a pager, a personal digital assistant, a gaming device, a media player, a digital camera, a digital calculator, a portable computer, a tablet computer, or a laptop computer. A communication device may include a media presenter, such as a media player or a word processor. The media presenter enables the communication device to present media instances, such as video files, audio files, and word processor document files, from a media container. A media container may be a communication, such as an e-mail, a text message, or a web browser, that contains at least one media instance. A communication device may receive a media container and activate a media presenter to present media instances from the media container. When a communication device activates a media presenter, the media presenter may present a video file, an audio file, and/or a document file to a communication device user.

SUMMARY OF THE INVENTION

In some embodiments, a system is provided for presenting media instances on communication devices. The system includes a processor on a communication device, a source component, and a target component. The source component, when executed by the processor, parses a selected media container to identify a set of media instances of a first type and constructs a media instance list that comprises the identified set of media instances, wherein the selected media container is inaccessible by an activated media presenter. The target component, when executed by the processor, enables the activated media presenter to present at least two of the set of media instances from the media instance list to a user interface without deactivating between presentations.

In some embodiments, a computer implemented method is provided for presenting media instances on communication devices. A media container is selected. The selected media container is parsed to identify a set of media instances. A media instance list that comprises the identified set of media instances is constructed. A media presenter is activated to present one of the set of media instances of a first type from the selected media container, wherein the selected media container is inaccessible by the activated media presenter. The media presenter is enabled to present at least two of the set of media instances from the media instance list to a user interface without deactivating between presentations.

In some embodiments, a computer implemented method is provided for presenting media instances on communication devices. A media container is selected. The selected media container is parsed to identify a set of media instances. A media instance list that comprises the identified set of media instances is constructed. A media presenter is activated to present one of the set of media instances of a first type from the selected media container, wherein the selected media container is inaccessible by the activated media presenter. The media presenter is enabled to present at least two of the set of media instances from the media instance list to a user interface without deactivating between presentations. The user interface is enabled to display at least part of the media instance list while the activated media presenter is presenting the one of the set of media instances. The user interface is enabled to highlight the one of the set of media instances in the displayed at least part of the media instance list.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

After a communication device receives a media container, the communication device may respond to a user selection by activating a media presenter to present a media instance from the media container. However, if the communication device does not transfer or copy the media container to a location that is accessible by the media presenter, the media presenter may be capable of only presenting one media instance from the media container before deactivating. For example, a mobile phone's web browser receives a web page that contains 15 uniform resource locators (URLs) for playing music, and the mobile phone user selects one of the 15 music options by activating a media player to play the selection. The media player deactivates after playing the music for the user if the media player is not able to access the web page. If the user wants to listen to the other music options, the user returns to the web page that contains the URLs and selects from the other options, which activates the media player another time. Users may feel that they are waiting for a long time for a media presenter to activate on a communication device with limited memory, such as a mobile phone. Furthermore, communication devices such as mobile phones may not have the capability to transfer or copy a media container to a location that is accessible by the media presenter. If a user wants a relatively large number of media instances in a media container to be presented, such as 15 music files from a web page, the user may become frustrated with having to stop whatever else they may be doing to reactivate the media presenter after each individual presentation of a media instance.

In some embodiments, systems and methods are provided for a media presenter to present multiple media instances on a communication device without deactivating between presentations. A communication device user selects a media container, such as by viewing a web page or an e-mail. In response to either the selection or an activation of a media presenter, a source component on the communication device parses the selected media container to identify media instances and constructs a media instance list that includes the identified media instances. For example, a source component parses a web page received by a mobile phone to identify all of the music files from the web page, and compiles a list of the music files. Before the communication device activates the media presenter, the source component may enable a user to select any media instances for presentation from the list of media instances. For example, the user selects which music files to play from the list before the media player activates. The communication device activates the media presenter to present any selected media instances.

Before the media presenter presents any media instances, a target component may enable the user to select any media instances for presentation from the list of media instances. For example, the user selects which music files to play from the list before the media player plays the selected music. The target component enables a media presenter to present multiple media instances from the list to a user interface without deactivating between presentations. For example, the target component provides a list of music files to a media player, which enables the media player to play multiple music files to a mobile phone's speakers without deactivating between the playing of each music file. The user interface may display the media instance list while the media presenter is presenting one of the media instances, and highlight the presented media instance in the list. For example, a mobile phone displays a list of a web page's music files, highlighting the currently playing music file. The user may select any media instances listed in the displayed list for presenting to the user interface, either after the media presenter is finished presenting the previously selected media instances, or during the presenting of the previously selected media instances. For example, while listening to a media player play previously selected music files, a user revises their previous selections. A user may have the option of selecting media instances from a list before a media presenter presents any media instances, while the media presenter is presenting any previously selected media instances, or after the media player has finished presenting previously selected media instances, thereby offering the user flexibility in selecting media instances for presentation. The construction and provision of the media instance list enables media presenters to present multiple media instances without deactivating between presentations, thereby saving time for a communication device user and increasing customer satisfaction.

Figure 1:
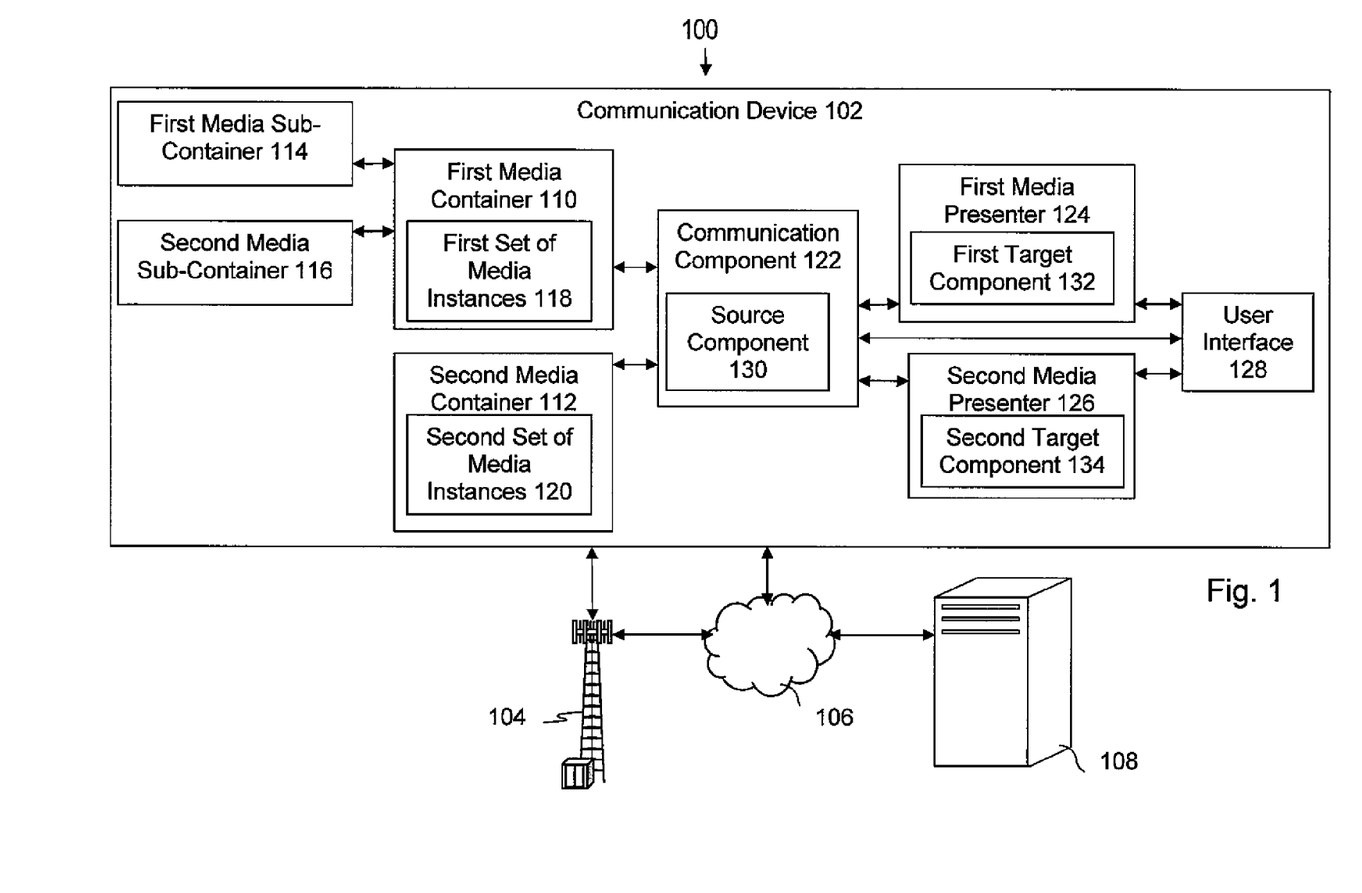
FIG. 1 illustrates a system for presenting media instances on communication devices according to some embodiments of the present disclosure.

Turning now to FIG. 1, a diagram of a system 100 for presenting media instances on communication devices is depicted according to embodiments of the present disclosure. The system 100 includes a communication device 102, a base transceiver station 104, a communication network 106, and a server 108. The communication device 102 may communicate with the server 108 via the base transceiver station 104 and the communication network 106.

The communication device 102 includes a first media container 110, a second media container 112, a first media sub-container 114, and a second media sub-container 116. A media sub-container may be a resource that is indirectly accessible via a media container, such as the content of an unselected web page that is accessible via a selected web page. The first media container 110 includes a first set of media instances 118 and the second media container 112 contains a second set of media instances 120. The communication device 102 also includes a communication component 122, a first media presenter 124, a second media presenter 126, and a user interface 128. The communication component 122 may be a web browser, an e-mail application, a text message application, or any similar communication application. Each of the communication device components 122-128 may be embodied as software applications, firmware applications, or combinations thereof that are stored in a memory on the communication device 102, loaded by the communication device 102, and executed by the communication device 102. Furthermore, each of the communication device components 122-128 may also be embodied by a combination of software, firmware, and hardware on the communication device 102.

When the communication device 102 receives the media containers 110 or 112, the communication component 122 enables a user to select from the set of media instances 118 or 120, which may activate the media presenters 124 or 126 to present from the media instances 118 or 120 via the user interface 128. For example, if the first media container 110 is a web page and the first set of media instances 118 is a list of music files, the communication component 122 selecting one of the music files activates the first media presenter 124, which is a media player, to present the music files via the user interface 128. In another example, if the second media container 112 is an e-mail and the second set of media instances 120 is a list of word processor files, the communication component 122 selecting one of the word processor files activates the second media presenter 126, which is a word processor, to present the word processor files via the user interface 128.

The communication component 122 may include a source component 130, the first media presenter 124 may include a first target component 132, and the second media presenter 126 may include the second target component 134. The components 130-134 may modify the components 122-126, such as a web browser plug-in from the source component 130 that modifies web browser code in the communication component 122. Although FIG. 1 depicts the components 130-134 on the components 122-126, the components 130-134 may be external to the components 122-126. For example, the source component 130 and the first target component 132 may be components between the communication component 122 and the first media presenter 124. The source component 130 and the first target component 132 may interact with the components 122-124 as application program interfaces that enable communication with other applications and/or the operating system of the communication device 102. The components 130-134 may be implemented separately as independent services or as part of an independent service that combines the functions of the components 130-134. The source component 130 may use a handshake to dynamically set parameters of a communications channel established with the target components 132-134 before normal communication over the channel begins. Those of skill in the art will recognize other examples of how to implement the components 130-134.

The user of the communication device 102 selects either the first media container 110, which may be a web page, or the second media container 112, which may be an e-mail. In response to the selection of the media container 110 or 112, the source component 130 may parse the selected media container 110 or 112 to identify a set of media instances, such as the first set of media instances 118, which may be music files, or the second set of media instances 120, which may be word processor files. Alternatively, the source component 130 may parse the selected media container 110 or 112 in response to the communication component 122 selecting the media instances 118 or 120 for presentation on the user interface 128, which also initiates activation of the media presenters 124 or 126.

The source component 130 may parse the selected media container 110 or 112 based on the media instances displayed by the selected media container 110 or 112 and/or meta-data associated with the selected media container 110 or 112. For example, the first media container 110 may be a web page that displays a list of music files that may be selected. Additionally, the source component 130 can modify or interact with the web browser to recognize meta data in a web page, whereby the meta data lists media instances that are not directly visible from the web page, such as hidden files or files from associated web pages. If the selected media container 110 or 112 includes any media sub-containers, such as the first media sub-container 114 and the second media sub-container 116, the source component 130 parses any media sub-containers 114 and 116 after parsing the selected media container 110 or 112. For example, if the first media container 110 is a web page and if the media sub-containers 114 and 116 are web pages that are accessible via the first media container 110, then the source component 130 modifies or interacts with the web browser to parse the first media container 110 and the media sub-containers 114 and 116 to compile a list of media instances from the web page and its associated web pages. Parsing based on meta data and the media sub-containers 114-116 saves time and effort for a user of the communication device 102 because media instances are identified for the media sub-containers 114-116 without the user of the communication device 102 having to spend the time and effort to directly access the media sub-containers 114-116.

The source component 130 constructs a media instance list that includes the set of media instances identified from the parsing. For example, the source component 130 modifies or interacts with the web browser to parse the first media container 110, which may be a web page, received by the communication device 102 to identify all of the music files from the web page, and compiles a list of the music files. If the selected media container 110 or 112 includes multiple types of media instances, the source component 130 compiles a list for each type of media instance. For example, if a web page lists music files and word processor document files, the source component 130 modifies or interacts with the web browser to compile one list of music files from the web page and another list of word processor document files from the web page. Parsing the media containers 110 or 112 for each type of the media instances 118 or 120 enables a user of the communication device 102 to select which of multiple types of media instances 118 and 120 to present to the user interface 128.

Before the communication device 102 activates the media presenter 124 or 126, the source component 130 may enable a user to select any media instances for presentation from the set of media instances 118 or 120. For example, a user selects which music files to play from a list of music files parsed from a web page before a media player activates. The communication device 102 activates the appropriate media presenter 124 or 126 to present any selected media instances. For example, if the user selects music files, the communication device 102 activates the media player, but if the user selects word processor document files, the communication device 102 activates a word processor.

Before the media presenter 124 or 126 presents any media instances, the target component 132 or 134 may modify or interact with the media presenter 124 or 126 to enable a user to select any media instances for presentation from the set of media instances 118 or 120. For example, the user selects which music files to play from the list before the media player plays the selected music. The source component 130, the first target component 132, or the second target component 134 may enable a user to select any media instances for presentation from the set of media instances 118 or 120.

The target component 132 or 134 modifies or interacts with the media presenter 124 or 126 to enable an activated media presenter 124 or 126 to present multiple media instances 118 or 120 from the media instance list to the user interface 128. For example, the first target component 132 provides the list of music files to the first media presenter 124, which may be a media player. In contrast to a user's selection of one of the media instances 118 or 120 activating a corresponding media presenter 124 or 126 to present only the selected media instance, the media instance list enables the media presenter 124 or 126 to present multiple media instances without deactivating between presentations. For example, the first media presenter 124 uses a media instance list to play multiple music files to the mobile phone's speakers without deactivating between playing each music file.

The user interface 128 may display at least part of the media instance list while the activated media presenter 124 or 126 is presenting one of the media instances and highlight the currently presented media instance in the media instance list. For example, a mobile phone displays a list of a web page's music files, highlighting the currently playing music file. The user interface 128 may also display at least part of a selected media container, such as a part of a web page that lists music files. Additionally, the user interface 128 may display the media instances 118 or 120 with identifiers, wherein each of the identifiers is associated with a displayed media instance, such as a text descriptor and/or an image corresponding to the displayed media instance. For example, the user interface 128 displays a text description and/or a thumbnail of a musician's image for each music file to assist the user in selecting from the music files. Furthermore, the user interface 128 may display media instances in a list based on a text descriptor order or a presentation frequency order. For example, the user interface 128 displays music files in alphabetical order based on the title of each music file, or in an order from the most frequently requested music file to the least frequently requested music file. Moreover, the user interface 128 may indicate a next media instance of the set of media instances to be presented, such as highlighting the next scheduled music file in a manner that is different from highlighting the currently playing music file.

Displaying the currently presented media instance and the media instance scheduled for the next presentation on the user interface 128 may enable the user to permit the current order of presentation to continue or to revise the order of presentation. For example, a user may select to stop the current music file from playing and start to play the next scheduled music file or select a different music file to play next. The displayed presentation list allows a user to change a presentation order by adding additional selections to a presentation list, by removing previous selections from the presentation list, and by rearranging the order of presentation for previous selections. However, the user is not required to interact with the communication device 102 between presentations if the user chooses to permit the current order of presentation to continue presenting the media instances 118 or 120 without the media presenters 124 or 126 deactivating between presentations.

The user interface 128 may enable a user to select a media instance based on a previously selected media container to present to the user interface. For example, the user previously selected the second media container 112, which is an e-mail, which caused the source component 130 to parse the second set of media instances 120 to construct a list of word processor files. The second media presenter 126, which is a word processor, may present the word processor document files after the first media presenter 124 finishes playing its list of music files. The user interface 128 may also enable a user to select a media instance listed in a previously received media container to present to the user interface. For example, after the communication device 102 previously received the second media container 112, the user did not previously select the second media container 112, such that the source component 130 did not parse the second set of media instances 120 to construct a list of word processor files. The user selects the second media container 112, which is an e-mail, which causes the source component 130 to parse the second set of media instances 120 to construct a list of word processor files, which the second media presenter 126, which is a word processor, uses to present the word processor files after the first media presenter 124 finishes playing its list of music files.

Though illustrated as a mobile phone, the communication device 102 may take various forms including a personal digital assistant (PDA), a media player, a mobile computer, a digital camera, a mobile telecommunication device, a telephone, a digital music player, a mobile handset, a handheld gaming device, a wireless mobile device, a pager, a portable computer, a tablet computer, a laptop computer, and a digital calculator. A suitable communication device may combine some or all of these functions. Communication devices are discussed below in reference to FIG. 3, FIG. 4, and FIG. 5. The communication device 102 may communicate by a radio access network providing access to the communication network 106. The server 108 is connected to the communication network 106. The communication device 102 communicates with the server 108 via the radio access network and the communication network 106. Other communication paths may also be used.

Figure 6:
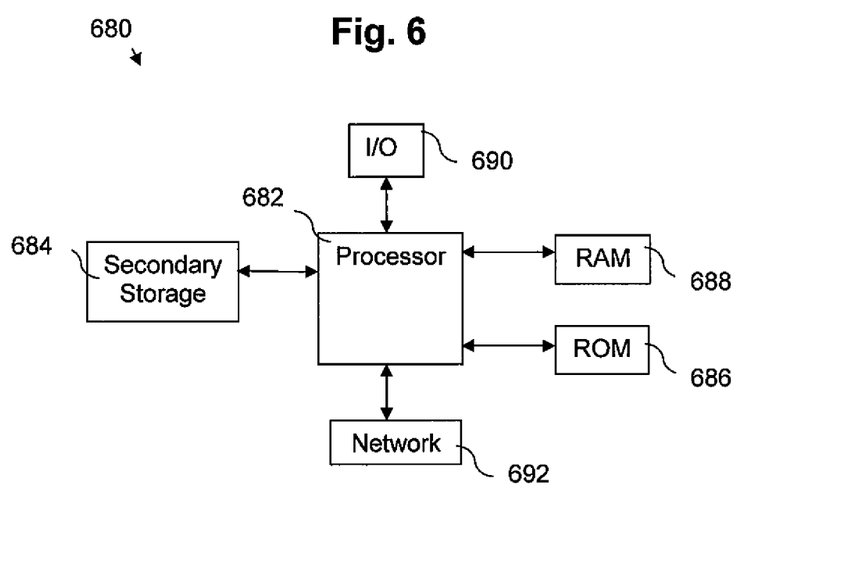
FIG. 6 illustrates an exemplary computer system suitable for implementing some aspects of the several embodiments of the disclosure.

The server 108 may be implemented on a computer system, which is discussed below in reference to FIG. 6. The source component 130 and the target components 132-134 may be implemented as a software program. The source component 130 and the target components 132-134 may modify the operation of the communication component 122, the first media presenter 124, and the second media presenter 126, respectively. Embodiments of the present disclosure modify the operation of the communication device components 122-126 to supplement the capabilities of the communication device components 122-126. Such a modification of operation may eliminate the need to replace any of the communication device components 122-126 to enable the media presenters 124-126 to present multiple instances without deactivating between presentations. The number and the types of communication devices, base transceiver stations, networks, servers, and communication device components in FIG. 1 are exemplary.

Figure 2:
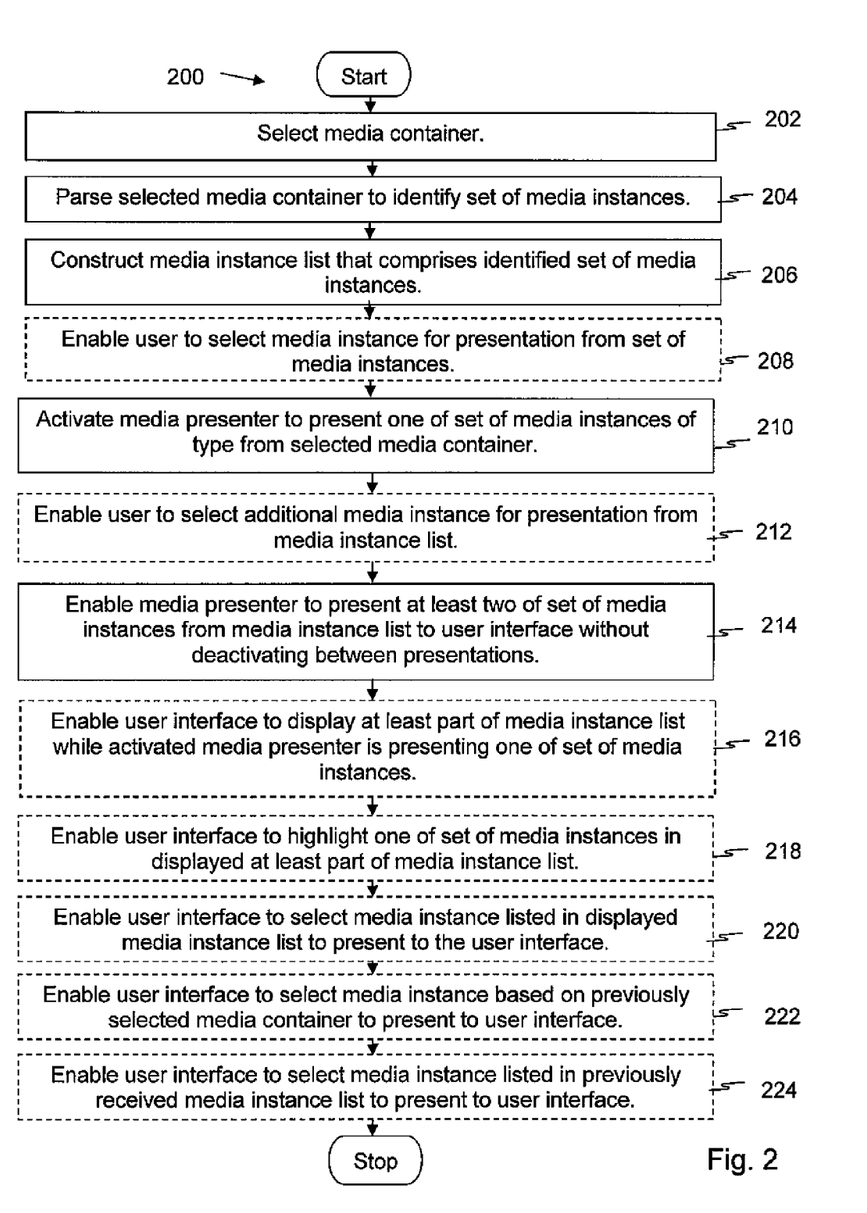
FIG. 2 is a flowchart of a method for presenting media instances on communication devices according to some embodiments of the present disclosure.

FIG. 2 shows a flowchart of a method 200 for presenting media instances on communication devices according to some embodiments of the present disclosure. The system 100 can execute the method 200 to enable a media presenter on a communication device to present multiple media instances without deactivating between presentations.

In box 202, a media container is selected. For example, the communication component 122 enables a user to select a web page.

In box 204, a selected media container is parsed to identify a set of media instances. For example, the source component 130 parses the web page to identify the music files.

In box 206, a media instance list that comprises an identified set of media instances is constructed. For example, the source component 130 constructs a list of the music files from the web page.

In box 208, a user is optionally enabled to select a media instance for presentation from a set of media instances. For example, the source component 130 enables a user to select the music files for presentation via the user interface 128.

In box 210, a media presenter is activated to present one of a set of media instances of a type from a selected media container. For example, the source component 130 activates a media player to present the music files from the list.

In box 212, a user is optionally enabled to select a media instance for presentation from a media instance list. For example, the source component 130 enables a user to select the music files from the web page for presentation.

In box 214, a media presenter is enabled to present at least two of a set of media instances from a media instance list to a user interface without deactivating between presentations. For example, the first target component 132 enables a media player to play the selected music file to the user interface 128 without deactivating between playing each music file.

In box 216, a user interface is optionally enabled to display at least part of a media instance list while an activated media presenter is presenting one of a set of media instances. For example, the first target component 132 enables the user interface 128 to display the list of music files from the web page while the media player is playing the selected music files.

In box 218, a user interface is optionally enabled to highlight one of a set of media instances in the displayed at least part of the media instance list. For example, the first target component 132 enables the user interface 128 to highlight the music file that the media player is currently playing.

In box 220, a user interface is optionally enabled to select a media instance listed in a displayed media instance list to present to the user interface. For example, the first target component 132 enables the user to select one of the music files from the web page for the media player to play next, either after the current music file finishes playing or instead of the currently playing music file.

In box 222, a user interface is optionally enabled to select a media instance listed in a previously selected media instance list to present to user interface. For example, the first target component 132 enables the user to select a word processor file from a previously selected e-mail for presentation to the user interface 128.

In box 224, a user interface is optionally enabled to select media instance listed in previously received media instance list to present to user interface. For example, the first target component 132 enables the user to select a word processor file from a previously received e-mail for presentation to the user interface 128.

Figure 3:
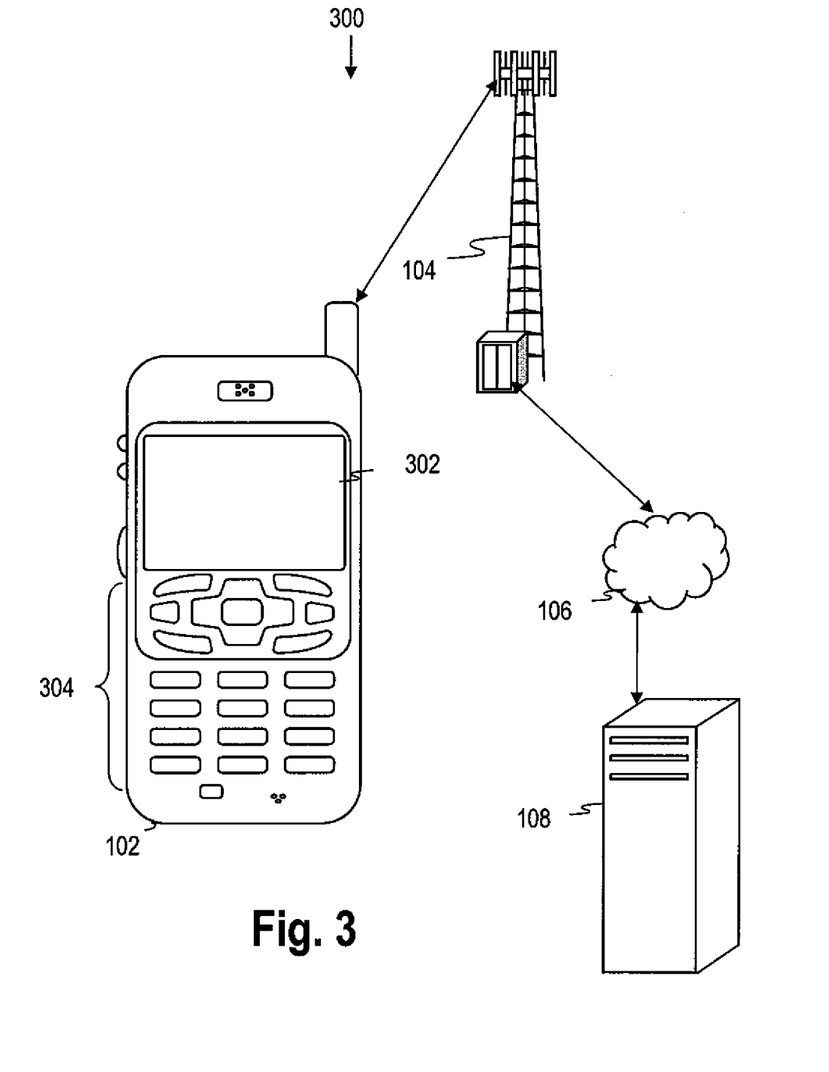
FIG. 3 shows a system for a communication device according to some embodiments of the present disclosure.

FIG. 3 shows a wireless communications system 300 including the communication device 102. FIG. 3 depicts the communication device 102, which is operable for implementing aspects of the present disclosure, but the present disclosure should not be limited to these implementations. Though illustrated as a mobile phone, the communication device 102 may take various forms including a wireless handset, a pager, a personal digital assistant (PDA), a gaming device, an inventory control device, a media player, a digital camera, a digital calculator, a portable computer, a tablet computer, and/or other. Many suitable communication devices 102 combine some or all of these functions. In some embodiments of the present disclosure, the communication device 102 may be a special-purpose communications device such as a mobile phone, wireless handset, pager, or PDA. The communication device 102 may support specialized activities such as gaming, inventory control, job control, and/or task management functions, and so on.

The communication device 102 includes a display 302 and a touch-sensitive surface or keys 304 for input by a user. The communication device 102 may present options for the user to select, controls for the user to actuate, and/or cursors or other indicators for the user to direct. The communication device 102 may further accept data entry from the user, including numbers to dial or various parameter values for configuring the operation of the communication device 102. The communication device 102 may further execute one or more software or firmware applications in response to user commands. These applications may configure the communication device 102 to perform various customized functions in response to user interaction. Additionally, the communication device 102 may be programmed and/or configured over-the-air, for example from a wireless base station, a wireless access point, or a peer communication device 102.

The communication device 102 may execute a web browser application which enables the display 302 to show a web page. The web page may be obtained via wireless communications with the base transceiver station (BTS) 104, a wireless network access node, a peer communication device 102 or any other wireless communication network or system. While a single base transceiver station 104 is illustrated, it is understood that the wireless communication system may comprise additional base transceiver stations. In some instances, the communication device 102 may be in communication with multiple base transceiver stations 104 at the same time. The base transceiver station 104 (or wireless network access node) is coupled to the network 106, such as the Internet. Via the wireless link and the wired network, the communication device 102 has access to information on various servers, such as the server 108. The server 108 may provide content that may be shown on the display 302. Alternately, the communication device 102 may access the base transceiver station 104 through a peer communication device 102 acting as an intermediary, in a relay type or hop type of connection.

Figure 4:
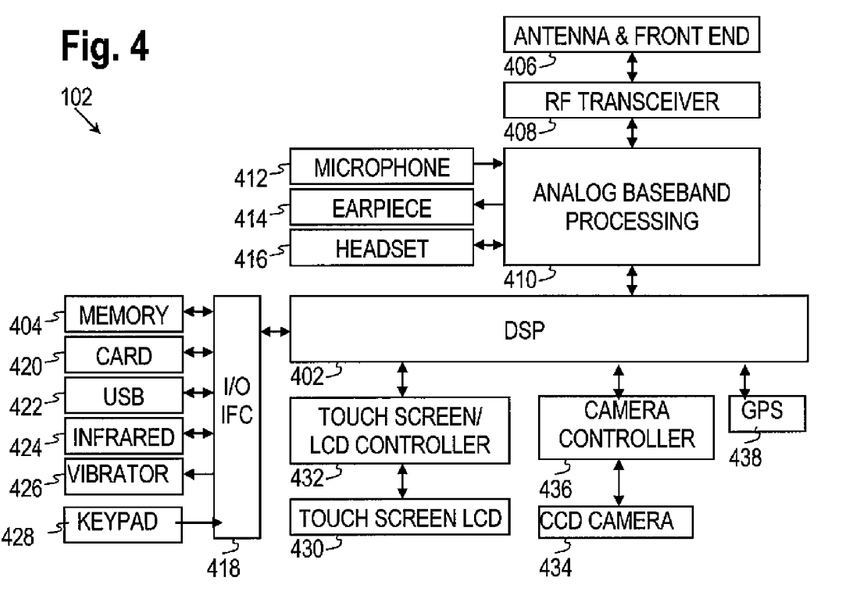
FIG. 4 shows a block diagram of an illustrative communication device.

FIG. 4 shows a block diagram of the communication device 102. While a variety of known components of communication devices 102 are depicted, in an embodiment a subset of the listed components and/or additional components not listed may be included in the communication device 102. The communication device 102 includes a digital signal processor (DSP) 402 and a memory 404. As shown, the communication device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the communication device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the communication device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the communication device 102 to send and receive information from a radio access network (RAN) or some other available wireless communications network or from a peer communication device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the communication device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the communication device 102 to function as a peripheral device to exchange information with a personal computer or other computer system. The infrared port 424 and other optional ports such as a Bluetooth interface or an IEEE 802.11 compliant wireless interface may enable the communication device 102 to communicate wirelessly with other nearby communication devices 102 and/or wireless base stations.

The input/output interface 418 may further connect the DSP 402 to the vibrator 426 that, when triggered, causes the communication device 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the communication device 102. Another input mechanism may be the touch screen LCD 430, which may also display text and/or graphics to the user. The touch screen LCD controller 432 couples the DSP 402 to the touch screen LCD 430.

The CCD camera 434 enables the communication device 102 to take digital pictures. The DSP 402 communicates with the CCD camera 434 via the camera controller 436. The GPS sensor 438 is coupled to the DSP 402 to decode global positioning system signals, thereby enabling the communication device 102 to determine its position. In another embodiment, a camera operating according to a technology other than charge coupled device cameras may be employed. Various other peripherals may also be included to provide additional functions, e.g., radio and television reception.

Figure 5:
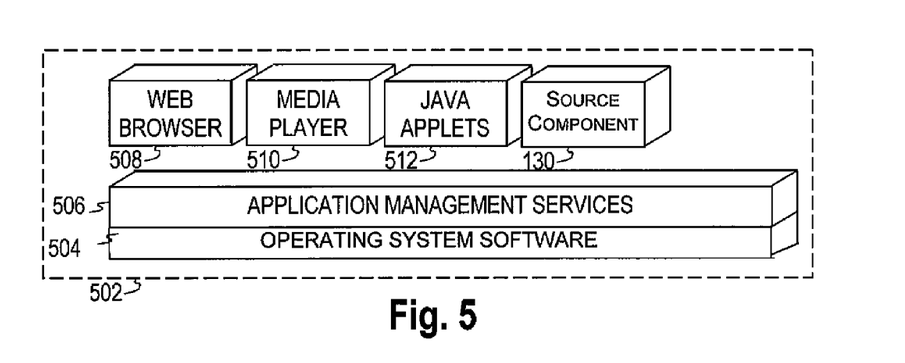
FIG. 5 shows a block diagram of an illustrative software configuration for a communication device.

FIG. 5 illustrates a software environment 502 that may be implemented by the DSP 402. The DSP 402 executes operating system drivers 504 that provide a platform from which the rest of the software operates. The operating system drivers 504 provide drivers for the communication device hardware with standardized interfaces that are accessible to application software. The operating system drivers 504 include application management services ("AMS") 506 that transfer control between applications running on the communication device 102. Also shown in FIG. 5 are a web browser application 508, a media player application 510, JAVA applets 512, and the source component 130. The web browser application 508 configures the communication device 102 to operate as a web browser, allowing a user to enter information into forms and select links to retrieve and view web pages. The media player application 510 configures the communication device 102 to retrieve and play audio or audiovisual media, and may include the first target component 132 or the second target component 134. The JAVA applets 512 configure the communication device 102 to provide games, utilities, and other functionality. The source component 130 may be depicted as part of the communication component 122, which may enable e-mail or text message communication. The web browser 508 may also include the source component 130.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation.

Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for presenting media instances on communication devices, comprising:
    a processor on a communication device;
    a source component that, when executed by the processor, parses a selected media container to identify a set of media instances of a first type, constructs a media instance list that comprises the identified set of media instances from the selected media container, selects a media presenter from a plurality of media presenters, and activates the media presenter, wherein the activated media presenter is configured to present, from the media instance list, a media instance of the first type, and wherein the selected media container is inaccessible by the activated media presenter; and
    a target component that, when executed by the processor, enables the activated media presenter to present at least two of the set of media instances from the media instance list to a user interface without deactivating between presentations, and enables the activated media presenter to present a media instance from a previously constructed media instance list.

2. The system of claim 1, wherein the communication device is one of a personal computer, a mobile telecommunication device, a mobile handset, a personal digital assistant, a mobile computer, a handheld gaming device, a wireless mobile device, a pager, a portable computer, a tablet computer, a laptop computer, a media player, a digital camera, a digital music player, and a digital calculator.

3. The system of claim 1, wherein the set of media instances is one of a set of uniform resource locaters and a set of word processor files.

4. The system of claim 1, wherein the activated media presenter is a word processor.

5. The system of claim 1, wherein the source component further enables a user interface to select a media instance for presentation from the set of media instances prior to an activation of the activated media presenter.

6. The system of claim 1, wherein the target component further enables a user interface to select a media instance for presentation from the media instance list prior to the activated media presenter presenting the at least two of the set of media instances.

7. The system of claim 1, wherein the source component parses the selected media container based on at least one of media instances displayed by the selected media container and meta-data associated with the selected media container.

8. The system of claim 7, wherein the selected media container is one of an e-mail or a text message.

9. A computer implemented method for presenting media instances on communication devices, comprising:

- selecting a media container comprising a plurality of types of media instances, wherein the plurality of types of media instances comprise at least two types of media instances selected from the group consisting of: a video file, an audio file, and a document file;
- parsing the selected media container to identify a plurality of sets of media instances, wherein each of the plurality of sets of media instances corresponds to a different type of media instance of the plurality of types of media instances;
- constructing a plurality of media instance lists that each comprise a set of media instances of the identified plurality of sets of media instances;
- selecting a first media instance list from the plurality of media instance lists;
- activating a media presenter configured to present a first type of media instance corresponding to a media instance of the first media instance list, wherein the selected media container is inaccessible by the media presenter; and
- enabling the media presenter to present at least two of the set of media instances from the first media instance list to a user interface without deactivating between presentations.

10. The computer implemented method of claim 9, wherein selecting the media container and activating the media presenter is enabled by a web browser.

11. The computer implemented method of claim 9, wherein the selected media container comprises at least one media sub-container and parsing the selected media comprises parsing the at least one media sub-container.

12. The computer implemented method of claim 9, further comprising enabling a user interface to select a media instance listed in a displayed media instance list to present to the user interface.

13. The computer implemented method of claim 9, further comprising enabling a user interface to select a media instance listed in a previously received media instance list to present to the user interface.

14. The computer implemented method of claim 9, further comprising enabling a user interface to select a media instance based on a previously selected media container to present to the user interface.

15. A computer implemented method for presenting media instances on communication devices, comprising:

- selecting a media container comprising at least one media sub-container;
- parsing the selected media container to identify a set of media instances, wherein parsing the selected media comprises parsing the at least one media sub-container;
- constructing a media instance list that comprises only the identified set of media instances from the media container and the at least one media sub-container;
- activating a media presenter selected from a plurality of media presenters to present one of the set of media instances of a first type from the media instance list, wherein the selected media container is inaccessible by the activated media presenter;
- enabling the activated media presenter to present at least two of the set of media instances from the media instance list to a user interface without deactivating between presentations;
- enabling the user interface to select a media instance listed in a previously received media instance list to present to the user interface;
- enabling the user interface to display at least part of the media instance list while the activated media presenter is presenting the one of the set of media instances; and
- enabling the user interface to highlight the one of the set of media instances in the displayed at least part of the media instance list.

16. The computer implemented method of claim 15, wherein enabling the user interface to display the at least part of the media instance list comprises displaying at least part of the selected media container.

17. The computer implemented method of claim 15, wherein enabling the user interface to display the at least part of the media instance list comprises displaying media instances and identifiers, wherein each of the identifiers is associated with one of the displayed media instances.

18. The computer implemented method of claim 17, wherein each of the identifiers comprise at least one of a text descriptor corresponding to a media instance and an image corresponding to the media instance.

19. The computer implemented method of claim 15, wherein enabling the user interface to display the at least part of the media instance list comprises displaying media instances in an order based on one of a text descriptor order and a presentation frequency corresponding to a media instance.

20. The computer implemented method of claim 15, wherein enabling the user interface to display the at least part of the media instance list comprises indicating a next media instance to present of the set of media instances.

* * * * *